United States Patent [19]

Ichikawa

[11] Patent Number: 5,360,327
[45] Date of Patent: Nov. 1, 1994

[54] BLADDER CARRYING APPARATUS FOR TIRE VULCANIZING PRESS

[75] Inventor: Katsumi Ichikawa, Takasago, Japan

[73] Assignee: Kabushiki Kaisha Kobe Seiko Sho, Kobe, Japan

[21] Appl. No.: 139,811

[22] Filed: Oct. 22, 1993

[30] Foreign Application Priority Data

Oct. 23, 1992 [JP] Japan .................................. 4-309366

[51] Int. Cl.$^5$ ........................................... B29C 35/02
[52] U.S. Cl. ......................................... 425/38; 425/48
[58] Field of Search .................... 425/38, 43, 48, 52

[56] References Cited

U.S. PATENT DOCUMENTS 4,614,485 9/1986 Sakaguchi et al. ................. 425/38
4,872,822 10/1989 Pizzorno ............................ 425/48

FOREIGN PATENT DOCUMENTS 60-161115 8/1985 Japan ................................ 425/48

*Primary Examiner*—James Mackey
*Attorney, Agent, or Firm*—Oblon, Spivak, McClelland, Maier & Neustadt

[57] ABSTRACT

A bladder carrying apparatus for a tire vulcanizing press by which a bladder assembly can be carried readily and rapidly onto and off of a center mechanism is disclosed. The bladder carrying apparatus includes an arm mounted on a chuck of a loader, which is mounted for upward and downward movement and also for turning movement for seating a green tire onto a lower metal mold of the tire vulcanizing press preferably mounted, for rotation motion between a center position on the center of the chuck and a retracted position outside of the perimeter of the loader, and a latch mounted on the arm for gripping an upper portion of a bladder assembly on a center mechanism of the tire vulcanizing press.

8 Claims, 6 Drawing Sheets

F I G. 4
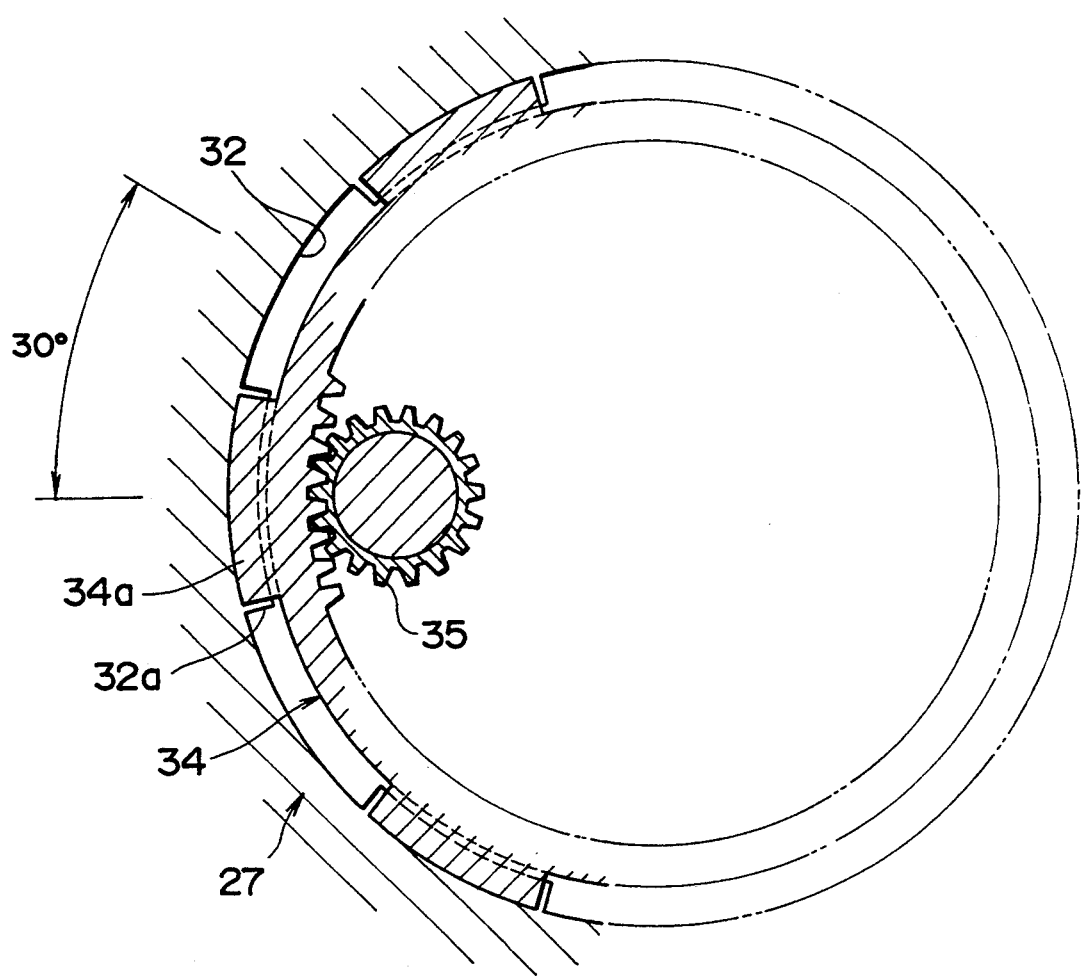

BLADDER CARRYING APPARATUS FOR TIRE VULCANIZING PRESS

BACKGROUND OF THE INVENTION

1. Field of the Invention

This invention relates to a bladder carrying apparatus for carrying a bladder assembly held by a center mechanism of a tire vulcanizing press onto and off of the center mechanism in order to replace the bladder assembly.

2. Description of the Related Art

First, a tire vulcanizing press will be described with reference to FIG. 5. The tire vulcanizing press includes a lower metal mold secured to a lower mold mounting member 51, an upper metal mold 54 secured to an upper mold mounting member 53 for closing and opening movement toward and away from the lower metal mold 52, a pressurizing cylinder 56 for applying a pressurizing force to a pressurizing force transmitting rod 55 mounted uprightly on the upper mold mounting member 53, a center mechanism 57 disposed for upward and downward movement at a central portion of the lower mold mounting member 51, and a loader 60 including a chuck 59 having gripping members 58 disposed at circumferential positions spaced by an equal distance from each other thereon. Both of the lower metal mold 52 and the upper metal mold 54 has built-in heating means therein, and the center mechanism 57 includes an expansible bladder 61 for engaging an inner face of a green tire to effect shaping of the green tire while a heat medium is supplied thereto. The loader 60 is mounted for upward and downward movement and also for turning movement and can suspend a green tire thereon by gripping an upper bead ring portion of the green tire from the inner side by means of the gripping members 58 of the chuck 59. The loader 60 can thus load a green tire from a position outside the press to a predetermined position on the lower metal mold 52.

In the tire vulcanizing press described above, since the bladder 61 repeats an expanding and compressing deforming movement for each vulcanizing cycle in a high temperature, high pressure environment, it must necessarily be replaced with a new bladder after each 5 to 8 days, and also when such damage as a puncture or a perforation occurs or upon changing of the metal mold, replacement of the bladder 61 is required. Therefore, the bladder 61 is conventionally replaced as shown in FIG. 6, by using a carrying apparatus including a suspending equipment 65 such as a fork-lift, to replace a bladder assembly 68 which holds the upper and lower ends of the bladder 61 by means of an upper supporting member 66 and a lower supporting member 67, respectively. In this instance, a new bladder assembly 68 placed outside the press is suspended by the suspending equipment 65, moved to a location above the center of the tire vulcanizing press (much skill is required for centering in this instance) and then lowered. Then, the lower supporting member 67 is turned by hand or by some other means so that it may be screwed onto an upper portion 70a of a lift cylinder 70 of the center mechanism 57, and then, the upper supporting member 66 is secured to an upper end 71a of a piston rod 71 of the center mechanism 57 by means of a bracket 72 thereby mounting the new bladder assembly 68 onto the center mechanism 57. Removal of the old bladder assembly 68 is performed using a procedure reverse to that just described.

Using the conventional carrying apparatus including the suspending equipment 65 such as a fork-lift, however, since the bladder assembly 68 is positioned just above and then moved down to the center mechanism 57 while the fork-lift or a like apparatus is operated, there is the problem in that centering between them is difficult. Therefore, much time and labor are required for replacement of the bladder assembly 68, and also much skill is required.

SUMMARY OF THE INVENTION

It is an object of the present invention to provide a bladder carrying apparatus for a tire vulcanizing press which can replace a bladder assembly readily and rapidly onto and off of the mold of the press.

In order to obtain the object described above, a gripper for gripping the bladder assembly is mounted on the tire loader already present as part of the tire vulcanizing press. This invention recognizes that the necessary movements for mounting a bladder assembly onto the center mechanism, i.e., movement from a position outside the press to a position above the center mechanism, followed by downward movement onto the center mechanism are already performed by an element of the vulcanizing press, namely the tire loader, and that therefore by mounting gripping means for gripping a bladder assembly on the tire loader, the task of replacing a bladder assembly can be readily and rapidly performed.

Using the bladder assembly carrying apparatus comprising a gripper mounted on the tire loader, since the gripper follows the movement of the tire loader while gripping the bladder assembly, the bladder assembly may be easily carried from a position outside the press to a position directly above the center mechanism of the mold and then lowered onto the center mechanism of the tire vulcanizing press. Accordingly, loading of a bladder assembly onto and off of the center mechanism for replacement of the bladder assembly can be performed automatically by simply rotating, raising and lowering the tire loader already provided in the tire vulcanizing press without the need to use external suspending equipment such as a forklift which also requires the assistance of an operator and furthermore by using the bladder assembly carrying apparatus according to this invention centering of the bladder assembly can be performed with certainty. As a result, the time required for replacement of a bladder assembly is reduced and if the bladder assembly carrying apparatus is combined with a center mechanism having special bladder mounting means, a series of carrying and mounting steps can be easily automated.

The gripper is mounted in such a way that it does not hamper the performance of the tire loader during the process of mounting and dismounting of tires. In a preferred embodiment this is realized by using a moveable gripper which can be moved from a position corresponding to the center of the tire loader, for the replacement of a bladder assembly, to a retracted position where it does not hamper the performance of the tire loader, during the process of mounting and dismounting of tires.

The above and other objects, features and advantages of the present invention will become apparent from the following description and the appended claims, taken in conjunction with the accompanying drawings in which like parts or elements are denoted by like reference numbers.

BRIEF DESCRIPTION OF THE DRAWINGS

FIG. 4 is a sectional view taken along line B—B of FIG. 3:

DETAILED DESCRIPTION OF THE PREFERRED EMBODIMENT

Figure 1:
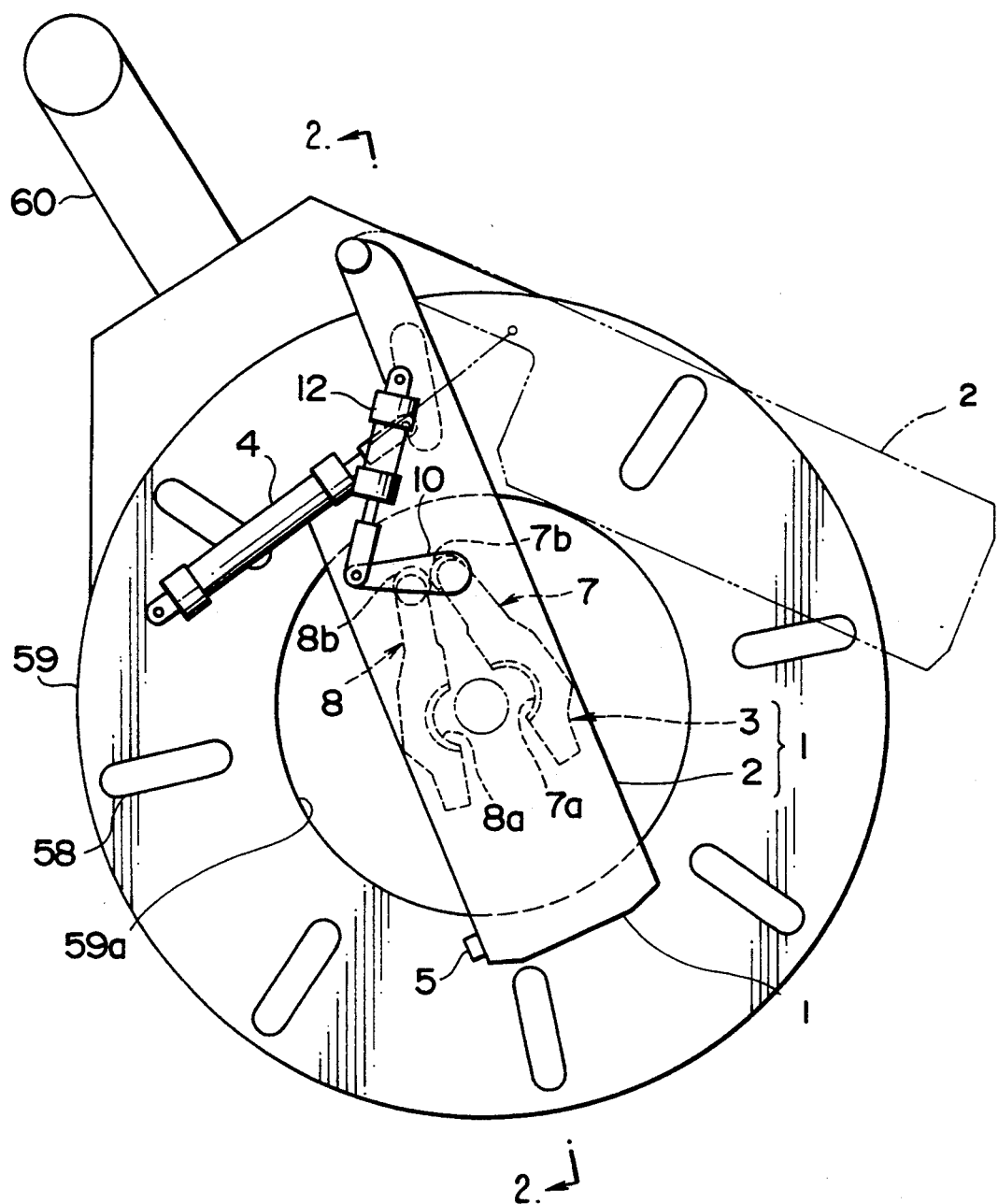
FIG. 1 is a schematic plan view of a bladder carrying apparatus for a tire vulcanizing press showing a preferred embodiment of the present invention.
Figure 2:
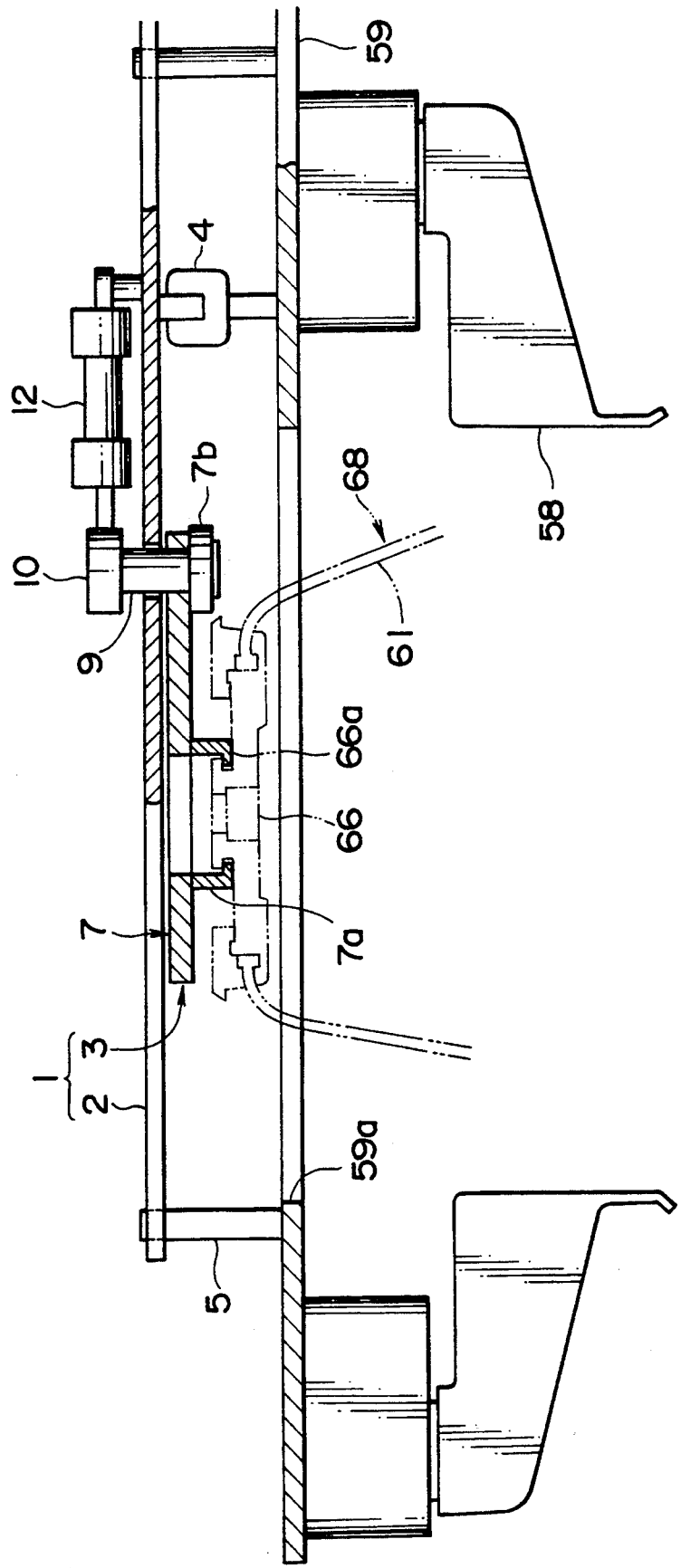
FIG. 2 is an enlarged sectional view taken along line A—A of FIG. 1.
Figure 5:
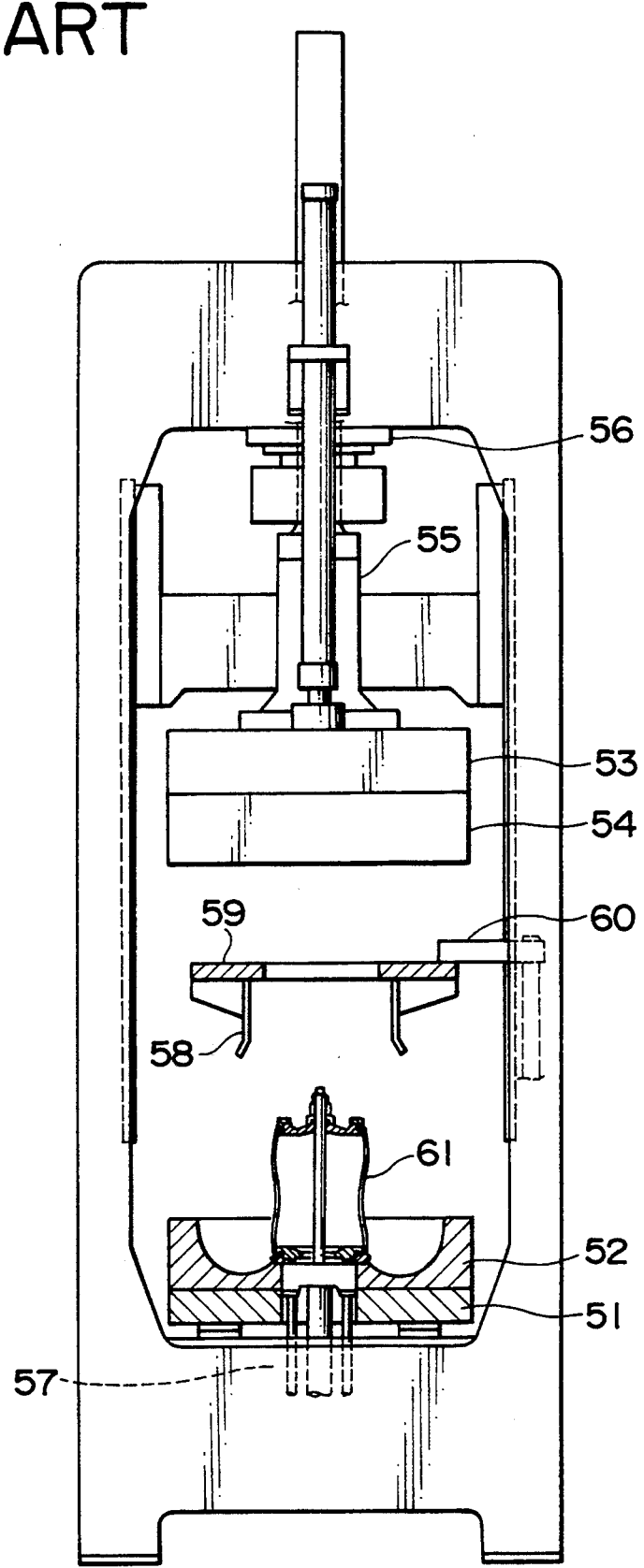
FIG. 5 is a schematic view showing an entire tire vulcanizing press.

Referring first to FIGS. 1 and 2, there is shown a bladder carrying apparatus for a tire vulcanizing press to which the present invention is applied. The bladder carrying apparatus is generally denoted at 1 and is provided for a tire vulcanizing press which includes a loader 60 and a chuck 59 of the kind present in the conventional tire vulcanizing press described hereinabove with reference to FIG. 5. It is to be noted that the present vulcanizing press is similar in construction to the conventional tire vulcanizing press of FIG. 5 and overlapping description thereof is omitted herein to avoid repetition. The bladder carrying apparatus 1 is different from the conventional bladder carrying apparatus described hereinabove with reference to FIGS. 5 and 6 in that it includes an arm 2 provided on the chuck 59 and a latch 3 mounted on the arm 2.

The arm 2 is connected to be rocked by a rocking cylinder 4 between a center position ① at the center of the chuck 59 and another retracted position ② outside a large diameter hole 59a of the chuck 59. When a bladder 61 stands uprightly in the large diameter hole 59a. The arm 2 is retracted to the retracted position ② so that it may not interfere with the bladder 61. The chuck 59 has a stopper 5 provided thereon so that the arm 2 may be positioned at the center position ① with certainty by the stopper 5.

The latch 3 is composed of a right holding member 7 and a left holding member 8 having pawl portions 7a and 8a and gear portions 7b and 8b thereon. respectively. The gear portions 7b and 8b of the holding members 7 and 8 are held in meshing engagement with each other, and the right holding member 7 is connected to an opening and closing cylinder 12 by way of a shaft 9 and a plate 10. When the opening and closing cylinder 12 operates, the gear portions 7b and 8b are rotated to open or close the latch 3. In the closed condition of the latch 3, the pawl portions 7a and 8a can grip a grooved portion 66a of the upper supporting member 66 of the bladder assembly 68.

Subsequently, a procedure of replacing a bladder assembly by the bladder carrying apparatus of the structure described above will be described. First, a mounting procedure will be described. The arm 2 of the bladder carrying apparatus 1 of FIG. 1 moved to the place for green tires outside the press, is turned to the center position ①, and the latch 3 is closed to hold the grooved portion 66a of the upper supporting member 66 of a new bladder assembly 68 placed on the place for green tires. Then, the loader 60 is moved up and turned to carry the new bladder assembly 68 to a position above the center mechanism, and then the loader 60 is moved down to lower the new bladder assembly 68 onto the center mechanism 57.

Figure 6:
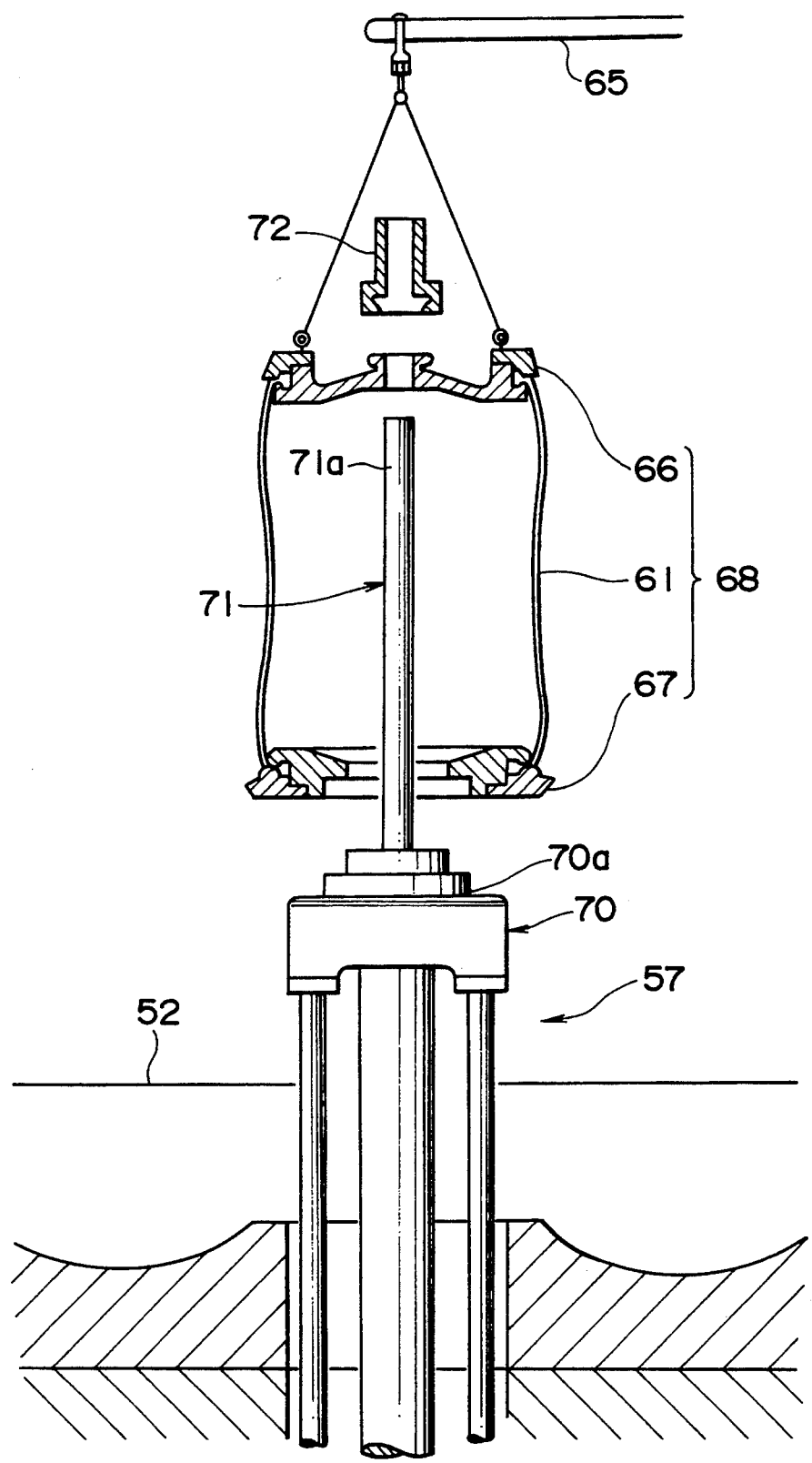
FIG. 6 is a schematic elevational view, partly in section, showing a conventional bladder carrying apparatus.

Thereafter, the lower supporting member 67 of the new bladder assembly 68 of FIG. 6 is secured to the lift cylinder 70 of the center mechanism 57, and the upper supporting member 66 is secured to the top end of the piston rod 71, thereby completing mounting of the new bladder assembly 68.

In order to remove the old bladder assembly 68 from the center mechanism 57, the upper supporting member 66 and the lower supporting member 67 of FIG. 6 are first released individually. Then, the arm 2 of FIG. 1 is moved to the center position ①, and in this condition, the loader 60 is turned to a position above the center mechanism and then moved down, whereafter the latch 3 is closed to grip the grooved portion 66a of the upper supporting member 66 of the old bladder assembly 68. Then, the loader 60 is moved up and turned to discharge the bladder assembly 68 to the outside of the tire vulcanizing press, thereby completing removal of the old bladder assembly 68.

Since the bladder carrying apparatus 1 including the arm 2 and the latch 3 provided on the chuck 60 which is mounted for upward and downward movement and also for turning movement, moves following the chuck 59 of the loader 60 in this manner, while the latch 3 grips an upper portion of the bladder assembly 68, the bladder carrying apparatus 1 can be turned between a position above the center mechanism and a position outside of the press, and can be moved upwardly and downwardly at each of these positions. Accordingly, loading of a bladder assembly onto and off of the center mechanism for replacement of the bladder assembly can be performed automatically by simply turning and moving up and down the loader provided for the tire vulcanizing press without using suspending equipment such as a fork-lift which requires the assistance of an operator. As a result, even at a location where the temperature is high or space is limited, an operation for replacement of a bladder assembly can be performed easily, and furthermore centering can be performed with certainty. Further, since the bladder carrying apparatus only includes an arm and a latch provided on a chuck of a loader of the tire vulcanizing press, it can be produced at a low cost.

Figure 3:
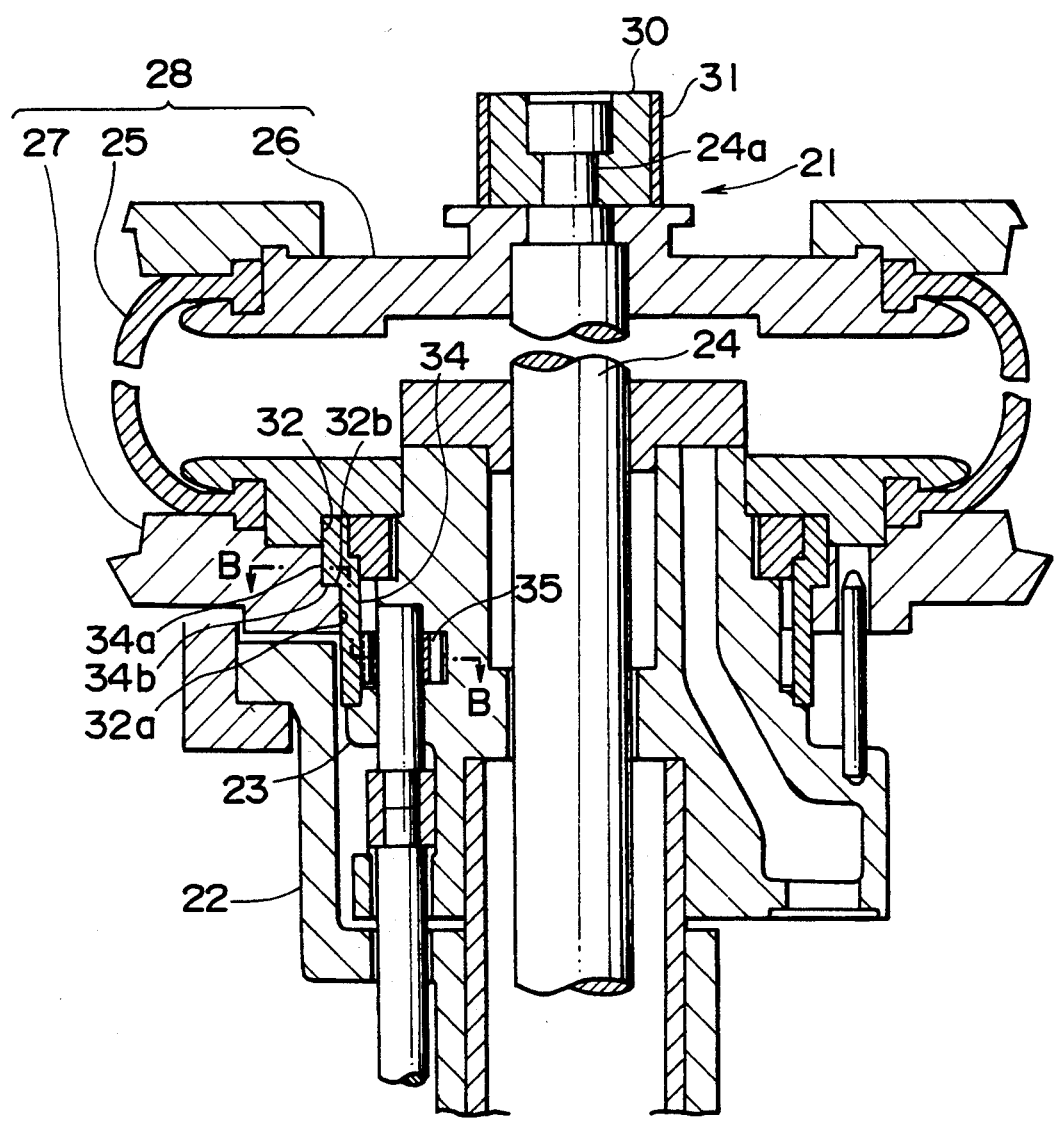
FIG. 3 is a vertical sectional view showing a center mechanism of a tire valcanizing press.

Further, where the bladder carrying apparatus is used, automation of the operation for replacement of a bladder assembly can be further enhanced, by employing a center mechanism having bladder mounting means as will be described with reference to FIGS. 3 and 4. The center mechanism 21 includes a lift cylinder 23 fitted for upward and downward movement in a guide sleeve 22, a piston rod 24 fitted for upward and downward movement in the lift cylinder 23, and a bladder assembly 28 including an upper supporting member 26 and a lower supporting member 27 for holding upper and lower ends of a bladder 25. A stepped projection 24a is formed at an upper end of the piston rod 24, and the upper supporting member 26 is fitted on the stepped projection 24a. A stepped block 30 split horizontally into two parts is mounted from the side onto at the stepped portion 24a of the piston rod 24, and a pipe member 31 is fitted on the stepped block 30 to secure the upper supporting member 26 at the upper end of the piston rod 24. A large diameter hole 32 is formed at a lower portion of the lower supporting member 27, and six radial projections 32a are formed at circumferential positions spaced by an equal distance from each other in said large diameter hole 32 of the lower supporting member 27. In addition, an engaging member 34 is supported for rotation in the lift cylinder 23 and has six radial projections 34a. Thus, in order to secure the lower supporting member 27 to the lift cylinder 23, the projections 34a of the engaging member 34 are advanced into the large diameter hole 32 passing between the projections 32a of the large diameter hole 32, and then a gear wheel 35 is rotated to rotate the engaging member 34 by 30 degrees, which is equal to one pitch of the projections 34a, so that lower ends 34b of the projections 34a of the engaging members 34 and upper ends 32b of the projections 32a of the lower supporting member 27 are engaged with each other.

With the center mechanism having such bladder mounting means as described above, the upper supporting member 26 can be mounted and dismounted onto and from the upper end of the piston rod 24 by a simple operation of fitting and removing the pipe member 31 onto and from the stepped block 30 at the upper end of the piston rod 24, respectively. Meanwhile, the lower supporting member 27 can be mounted and dismounted onto and from the lift cylinder 23 by simply rotating the engaging member 34 by way of the gear wheel 35. Accordingly, when a replacing operation of a bladder assembly is performed by means of a center mechanism having the bladder mounting means described above and using the bladder carrying apparatus of the present invention, all steps of the operation can be automated except for the fitting and removal of the pipe member 31 upon mounting and dismounting of the upper supporting member 26. Consequently, the time required for replacement of a bladder assembly is reduced remarkably and the replacing operation can be performed with safety.

Having now fully described the invention, it will be apparent to one of ordinary skill in the art that many changes and modifications can be made thereto without departing from the spirit and scope of the invention as set forth herein.

What is claimed is:

1. A tire vulcanizing press comprising:
   co-operating upper and lower molds onto which a tire may be placed for vulcanizing;
   a bladder assembly positioned at the center of one of said upper and lower molds;
   a tire loader for loading tires onto and off of one of said upper and lower molds; and
   a gripper mounted on said tire loader for gripping said bladder assembly.

2. The tire vulcanizing press of claim 1 wherein the tire loader is mounted so as to be centerable over the center of said upper and lower molds.

3. The tire vulcanizing press of claim 1 wherein said gripper is a movable gripper.

4. The tire vulcanizing press of claim 3 wherein said movable gripper is pivotally mounted for rotational displacement.

5. The tire vulcanizing press of claim 4 further comprising a stopper mounted on said tire loader for limiting the displacement of said gripper.

6. The tire vulcanizing press of claim 1 further comprising an arm mounted on said tire loader and wherein said gripper is mounted on said arm.

7. The tire vulcanizing press of claim 6 wherein said arm is a movable arm.

8. The tire vulcanizing press of claim 7 wherein said arm is pivotally mounted on said tire loader.

* * * * *